Patented Feb. 1, 1944

2,340,321

UNITED STATES PATENT OFFICE 2,340,321

RUBBER CONVERSION PRODUCT AND METHOD OF MAKING SAME

Thomas Raymond Griffith, Ottawa, Ontario, Canada

No Drawing. Application August 30, 1939, Serial No. 292,699

18 Claims. (Cl. 260—768)

This invention relates to the preparation of rubber conversion products which are suitable for the preparation of adhesives, molded products and as a base for paints, varnishes, and the like.

Rubber conversion products have heretofore been prepared and used as adhesives to bond rubber to metal, but they have not been satisfactory because they are generally thermoplastic, becoming softer and more plastic than crude rubber at elevated temperatures. Rubber and metal bonded with such conversion products heretofore produced cannot, therefore, be removed from hot molds and the bond does not have the required strength at elevated temperatures.

Other adhesives for bonding rubber to metal are extremely expensive and require a preliminary heating to polymerize them on the metal before the rubber may be applied thereto.

It is, therefore, an object of this invention to provide an improved rubber derivative which may be used as an adhesive and as a base for paints, having superior aging properties and resistance to atmospheric conditions.

It is another object of this invention to provide a method of making a rubber derivative which has improved properties.

It is still another object of this invention to provide an adhesive which is less plastic than rubber at elevated temperatures, so that composite articles bonded therewith may be removed from the hot mold without destroying the strength of the union.

It is a further object to provide composite articles and a method of making composite articles having superior strength at elevated and at ordinary temperatures.

It is a still further object of this invention to provide a rubber conversion product which may be produced at relatively low cost, which is soluble in less expensive rubber solvents and which when used as an adhesive for bonding rubber to metal does not require a polymerizing or other treatment on the metal before the rubber is applied.

The improved rubber conversion product of this invention is prepared by milling suitable conversion reagents into rubber such as Hevea smoked sheet, or pale crepe, sheeting the product into relatively thin sheets, heating the sheets under suitably controlled conditions until the desired reaction occurs, and then masticating the product to render it soluble in rubber solvents.

The properties of the rubber conversion product produced depend to a large extent on the reagent used in its formation, certain reagents giving adhesives having considerably improved properties. Conversion reagents which in general have been found to give products with good properties may be mixtures of one or more salts of a strong acid in conjunction with a weakly acidic substance. It is thought that these conversion reagents have a polymerizing action on rubber under proper conditions and reduce the number of double bonds. The character of the product seems to be improved when both of the ingredients of the conversion reagent are solids and is further improved when one or more of the solid substances contains considerable water of crystallization. The sulfates, and, in particular, the acid sulfates or double sulfates are preferred, especially when they contain considerable water of hydration. For best results, these materials are used with a suitable cooperating ingredient, such as a weakly acidic substance or a material such as $P_2O_5$ or $PCl_5$, which with water forms a weak acid. Aluminum acid sulfate, when properly used with a cooperating material of the character of phosphoric acid, produces rubber reaction products having exceptionally desirable properties for use both as an adhesive and as a basis for paints.

Examples of the acid sulfates or double sulfates which are particularly desirable for use are those of aluminum, iron (both ferric and ferrous), the alkali metals, including ammonia, alkaline earth metals and the closely related alums, potassium alum and other alums. In addition to the acid sulfates, certain sulfates may be used advantageously. Examples of these are sulfates of iron (both ferric and ferrous), aluminum, copper, mercury, and cadmium. Examples of salts of strong acids other than sulphuric acid are bromides of mercury and zinc, chlorides of mercury, tin and aluminum, and alkali metal iodides. Phosphoric acid is a very good example of a weakly acidic substance desirable for use in forming the rubber conversion product hereinbefore mentioned. For some uses, where it is desirable to have the conversion product somewhat more soluble in rubber solvents, oxalic acid has been used advantageously. Other weak acids that are also desirable for use are benzoic, tartaric, phthalic and salicylic. The particular acid may be selected for the properties it gives to the conversion product, as various acids seem to impart slightly different properties.

These weakly acidic materials, while assisting in the formation of the rubber derivatives, are not absolutely essential ingredients of the conversion reagents, and may, in some cases, be omitted.

The quantity of salts of strong acids required to convert the rubber into the derivative is, however, much larger when the weakly acidic compound is omitted as a part of the conversion reagent. Thus, the rubber derivative may be prepared by using aluminum acid sulfate alone as the conversion reagent, but its properties as an adhesive are improved and the quantity of reagents required is decreased when phosphoric acid or other weak acid is also present.

In the preparation of the conversion products, the conversion reagent is milled or otherwise suitably mixed with the rubber, until it is thoroughly incorporated. It has been found that the amount and the conditions of mastication have a marked influence on the character of the conversion product produced. Adhesives of greater strength are produced, with given reagents, when the amount of mastication is reduced to a minimum. Mastication in the presence of an acid such as sulfuric, sulfurous, sulfonic, etc., is particularly harmful. Conversion reagents of a solid nature are, therefore, preferred both because they may be quickly incorporated with a minimum of milling, and the mastication of the rubber in the presence of such ingredients is less harmful to the character of the conversion product.

Preferably, there should be present in the mix from 1.5% to 15% of water, including any water of crystallization that may be present. The amount of water may vary outside of and beyond these limits for the production of materials with desired specific properties but usually in the production of adhesives 3 to about 9 or 10% of water should be present in the mix. Ordinarily some free water is added during the mixing to bring the total quantity within this value.

Since water may be milled into the rubber more rapidly than liquid acids and the water and solid anhydride of a weak acid produces less deleterious effects on the rubber than liquid acids, it will be seen that it is advantageous to utilize a solid acid anhydride and water instead of liquid acids. Phosphoric acid is an example of the acid constituent of the reagent preferably used and it is desirable to mix its solid anhydride ($P_2O_5$) into the rubber and then add any water desired.

The mixed product is preferably formed into relatively thin sheets, of an appropriate thickness of about 2 or 3 mm. or so, which are placed in an oven with temperature control and heated for an appropriate period. The temperature and time of heating greatly affect the character of the reaction product. During the heating an exothermal reaction occurs and if the temperature of the sheets rises too high the adhesive quality of the product will be weaker at elevated temperatures. The temperature in the sheets should not rise substantially higher than about 170° C. and superior products are obtained when the temperature remains considerably below this value. Preferably the oven temperature should not be higher than about 140 to 155° C. The control of temperature is aided by the use of thin sheets having a thickness of about 2 or 3 mm. or even less. Also, the evaporation of the water contained in the sheets serves to keep the temperature down. If desired, an inert gas or air may be circulated over the sheeted material in the oven.

It is preferred, however, to heat the mix in an atmosphere having less oxygen pressure than the partial pressure of oxygen in air such as is obtained with an inert gas or in a vacuum. Ordinarily a relatively high vacuum, such as about 500 mm. or more, of mercury is preferred. By carrying out the reaction in a vacuum or an inert gas, the tendency for portions of the thin sheets to become harder than others is substantially eliminated, and a more uniform product is obtained.

The formation of the mix into thin sheets, such as 1 to 5 mm., or preferably 2 to 3 mm. or so, is beneficial, regardless of the conversion reagent used, and is also important in facilitating the reaction, it being found that the reaction takes place with difficulty, and higher maximum temperatures are attained in portions of a mixture when relatively thick sheets are used. When thicker sheets, such as those 5 to 10 mm. thick, are used, any water that is present tends to delay the reaction, and a more undesirable product for many purposes results. In thick sheets, with no water present, the temperature goes so high in the reaction that the product is not of practical value as an adhesive.

By the use of very thin sheets, such as 1 mm. or so in thickness, it is possible to carry on the reaction at temperatures as low as 100° C. to 105° C., and a derivative having higher molecular weight is produced, which is relatively less soluble and relatively more elastic at elevated temperatures. The use of conversion reagents which are solid, or volatilize with difficulty, is advantageous in carrying out the reaction when the material is in the form of thin sheets. When readily volatile reagents are used and the mix is sheeted into thin sheets, sufficient of the reagent or reagents may be volatilized so that the reaction is incomplete, even in the middle of the sheet.

The sheeted material is heated for a sufficient time to allow the reaction to progress to the desired stage. A somewhat harder product is produced by increasing the quantity of conversion reagent, by heating a given mixture for a longer period of time at the same temperature, or by reducing the thickness of the sheets. The reaction takes place at lower temperatures when larger quantities of the conversion reagent are used, or when the mix is sheeted to relatively thinner sheets. The reaction products produced at the lower temperature, however, are relatively less soluble on milling, particularly when the product is relatively soft.

After the reaction, the material is substantially insoluble in rubber solvents, but solubility may be restored by masticating the material for a sufficient time on a rubber mill or in a suitable mixer.

Solubility of the product depends to a large extent on the amount of mastication, and, for the production of adhesives, such as are desired for bonding rubber to metal, the mastication of the reaction product should be reduced to the minimum required for solubility. Working or mastication of the reaction product has a more harmful effect on the strength of the adhesive when acids are present, and it is, therefore, preferable to incorporate a basic material into the product as soon as possible during this mastication period, to neutralize any acids or acidic substance that might be present or formed during the reaction. In the making of a conversion product for use as an adhesive, an alkali, such as NaOH, may be used, if desired, and the soluble salts removed with water, but it is usually preferable to add basic materials, such as oxides or carbonates of zinc, magnesium, etc., which neutralize acids and which may be left in the masticated product.

When the conversion product is to be used for the making of adhesives, powdered solids, such as zinc oxide, or finely divided, fibrous materials, such as short fiber asbestos, may be added to the conversion product as it is being reworked or remasticated. These materials appear to have the effect of improving the strength of the bond when the solution of the conversion product is used as an adhesive for bonding rubber to metal, etc.

When the conversion product is to be used in the manufacture of paints and the like, the product may or may not be neutralized. A somewhat increased solubility is obtained when residual acidic substances or acid pigments are present.

The quantity of conversion reagent used in forming the rubber conversion product is dependent on the character of the conversion product desired and the conversion reagent used. Larger quantities of conversion reagent, such as aluminum acid sulfate with phosphoric acid, give harder products when heated for a given length of time. When a weakly acidic compound is not present, a larger quantity of the acid salt of strong acid must be used to produce conversion products of the same hardness. This may amount to 50% or more of the rubber mixture. When a weak acid, such as phosphoric, is also present, the total of both ingredients of the conversion reagent may, in some cases, be less than 10% of the rubber mixture.

The characteristics of the derivatives produced are also somewhat dependent on the rubber used as a starting material, and the strongest adhesive is produced from rubber such as pale crepe, smoked sheet, etc. Masticated rubber may, however, be used as a basis for preparation of the derivative, but it is desirable that the amount of mastication be kept at a minimum for the making of adhesives. Other rubberlike materials, such as reclaim rubber and African or Congo rubber, may be used for the production of rubber derivatives of the type herein disclosed.

The following examples, in which the parts are by weight, illustrate the preparation of the rubber derivatives:

*Example 1*

Rubber (pale crepe) _____ 100
Aluminum acid sulfate _____ 100

These ingredients were thoroughly mixed on a rubber mill sheeted to about 2.5 mm., heated in vacuum at 150° C. for 2 hours, and masticated and preferably washed with water on a rubber mill for a sufficient time to render the product soluble in rubber solvents.

When a weakly acidic substance, such as phosphoric acid or its anhydride, is added to the rubber, the amount of aluminum acid sulfate may be decreased substantially and an improved conversion product is produced.

*Example 2*

Rubber _____ 100
Oxalic acid _____ 10
Sodium acid sulfate _____ 70
Water _____ 1

The oxalic acid and sodium acid sulfate were milled into the rubber, and the water then added as rapidly as it was taken up by the rubber. The material was sheeted to about 3 mm. and heated at about 165° C. for 2½ hours on perforated trays in a vacuum oven. The product was then solubilized by mastication on a rubber mill; zinc oxide and pigments may be added during this mastication in sufficient quantity for the production of paints.

If desired, other materials, such as those heretofore mentioned, may be substituted in proper combination for the sodium acid sulfate and oxalic acid in the above examples for the production of conversion products having desirable properties.

In the preparation of composite articles, the rubber conversion products are preferably used in solution as an adhesive. If one or more of the members of the composite article is sufficiently porous to permit the escape of solvent, or is capable of absorbing the solvent, the composite article may be prepared by simply coating one or both of the surfaces, which are to be adjacent each other, with a solution of the adhesive, then placing both surfaces together, whereby they are in contact with the liquid adhesive, and permitting the adhesive to dry while the surfaces are in contact. If neither of the materials is sufficiently porous or absorbent to permit the escape of solvent, the adhesive coating on one or more of the surfaces should be allowed to dry before assembly, and the composite article may be completed by the application of heat and pressure. In the production of composite articles of rubber and metal, the metal is preferably coated with one or more coats of a suitable solution of the rubber conversion reagent, each coat being allowed to dry before another is applied. The rubber is then superimposed on the metal coated with adhesive and heated or vulcanized. The rubber may be vulcanized on the metal in a mold and the assembly may be removed from the mold without cooling the mold.

It has been found that a superior union or bond between a hard and soft material, such as metal and rubber, is produced when layers of successively softer conversion products, prepared in accordance with this invention, are applied to the metal. In bonding rubber to metal it is not always beneficial to use layers of successively softer rubber adhesives. If the adhesives have broken-down molecular structure, due to the reagents used or process of preparing the adhesives, the use of several coatings of decreasing hardness does not have the effect of improving the strength of the bond.

The strength of the bond between rubber and metal, obtainable when using the rubber conversion products of this invention, may be further increased when suitable short fibers or powdered solids are incorporated in the adhesive. Examples of such materials are short fiber asbestos, carbon black, zinc oxide, magnesium carbonate, and the like.

The preparation of adhesives for bonding rubber to metal is illustrated by the following examples, in which the parts are by weight:

*Example 3*

Crude rubber (high grade) _____ 100
Phosphorus pentoxide ($P_2O_5$) _____ 4.5
Acidified aluminum sulfate
  ($Al_2(SO_4)_3.H_2SO_4.3H_2O$ +
  $Al_2(SO_4)_3.18H_2O$) _____ 18
Water _____ 1.2

These ingredients were thoroughly mixed together on a rubber mill, and sheeted to 2.5 mm. thickness or less. These sheets were then heated on perforated trays in a vacuum oven for 2 hours at 150° C. The material which was a relatively hard conversion product was solubilized by milling and dissolved in an appropriate solvent to produce the adhesive. Ten parts of zinc oxide, 30 parts of carbon black and 2 parts of an antioxidant were added during the reworking period in this case. The zinc oxide was added as soon as possible after the start of the milling to be certain that any reactive acid material that may have been present was immediately neutralized.

*Example 4*

| | |
|---|---|
| Rubber (pale crepe) | 100 |
| Acidified aluminum sulfate | 9 |
| Phosphorus pentoxide | 2.4 |
| Water | 1 |

These ingredients were mixed and sheeted as in Example 3. The aluminum acid sulfate and the $P_2O_5$ are preferably added to the rubber in master batch form and the water incorporated last. The relatively thin sheets were heated for about 90 minutes at 150° C. in a vacuum oven and then masticated for about 30 minutes to render them soluble. During the mastication they were compounded with 80 parts of zinc oxide and 2 parts of an antioxidant, the zinc oxide being added as soon as possible for the above mentioned reason. The material of Example 3 was harder than that of Example 4.

In the preparation of composite articles it is, therefore, preferable that the metal be first coated with adhesive solution of Example 3 and after this has dried with a solution of the material of Example 4. Also, preferably, a further coat of a suitable tie cement is applied. The rubber to be bonded to the metal may now be applied and vulcanized directly thereto, a strong bond being produced.

The tie cement may contain a suitable amount of powdered solids such as zinc oxide, or short fibrous material such as short fiber asbestos.

The tie cement may be formed by mixing 100 parts of rubber with suitable compounding ingredients, such as about 40 parts of carbon black, 20 parts short fibre asbestos, 1.25 parts stearic acid, 5 parts zinc oxide, with or without vulcanizing agents and antioxidants, and dissolving the compounded rubber in suitable solvents.

A sample of sand blasted metal was coated successively with the adhesives of Examples 3, 4, and the tie cement above, each coat being allowed to dry before the next was applied. The coated metal was placed in contact with vulcanizable rubber and the assembly heated in a suitable mold under pressure. The assembly was removed from the hot mold, and when tested, the strength of the bond was 775 lbs./sq. in. at room temperature and 175 lbs. to 200 lbs./sq. in. at 100° C.

The suitability of an adhesive for uniting rubber to metal and the like is determined to a large extent by the plasticity of the material at elevated temperatures. The plasticity of the material may be measured by subjecting it to compression under a suitable stress such as one kilogram per square centimeter, measuring the deformation, then releasing the stress on the material and measuring its recovery. A higher ratio of recovery to deformation indicates the superior product which has less plasticity. The rubber derivatives produced according to this invention and particularly those produced when an aluminum acid sulfate and $P_2O_5$ is used as the conversion reagent, have less deformation than rubber and are less plastic than rubber at elevated temperatures. Thus a derivative produced with aluminum acid sulfate and $P_2O_5$ as in the above examples gave a recovery to deformation ratio of .80 at 120° C., whereas the ratio of recovery to deformation of pale crepe rubber is but .50 under similar conditions.

When sufficiently purified the major portion of the rubber conversion products made as above set forth are hydrocarbons. Hydrocarbons derived from rubber by the treatment with conversion reagents together with heating as above set forth have, as is evidenced by iodine values, less chemical unsaturation than rubber and the same unit empirical formula as rubber, namely, $C_5H_8$. Such conversion products are dissolved in a suitable solvent to produce adhesives suitable for bonding rubber to metal. It is preferable, however, that the solvent be one which on evaporation leaves no blisters.

In the making of adhesives according to this invention the conversion reagent is mixed into the rubber with a minimum of mastication, the reaction is carried on at a relatively low temperature, and the product is masticated only a sufficient degree to render it soluble in rubber solvents. The conversion product or the base of the adhesive thus produced is believed to have relatively large molecules, and, therefore, produces bonds with more strength at elevated temperatures.

Since the adhesives are less thermoplastic than rubber at elevated temperatures, the adhesive may be applied in thicker coats than the very thin coat desirable to be used when the thermoplastic adhesive is used.

Bonds made between rubber and metal and between rubber and other solids with adhesives made and applied according to the present invention have relatively high strength, are not thermoplastic, and are heat resistant. In the production of paints and the like, which are resistant to chemicals, adhere well and are stable, the derivatives are dissolved in suitable solvents mixed with pigments, oils, etc. All or part of the desired pigments may be added during the mastication or solubilization of the conversion product.

This application is a continuation in part of my applications Serial Nos. 15,470, filed April 9, 1935, for Thermoplastic rubber and method of making the same; 78,896, filed May 9, 1936, for Adhesive and method of making the same; 78,897, filed May 9, 1936, for Composite product and method of making the same; 151,486, filed July 1, 1937, for Rubber isomer and method of making the same; and 184,241, filed January 10, 1938, for Composite product and method of making same.

Various modifications may be made in the above described process without departing from the principles of the invention herein set forth, and it is my intention not to limit the appended claims except as may be necessitated by the prior art.

What I claim is:

1. A process for producing rubber conversion products, which comprises forming an intimate mixture of rubber, an acid sulfate and a weak acid, forming the mixture into relatively thin section, and heating the mixture thus formed to procure a reaction.

2. A process for producing soluble rubber conversion products, which comprises forming an intimate mixture of rubber, aluminum acid sulfate and phosphoric acid anhydride, heating the mixture to procure a reaction product, and masticating the product to solubilize it.

3. A method of producing a rubber conversion product, which comprises forming a mixture of rubber, a salt of a strong acid, and a weakly acidic compound, adding sufficient water, if necessary, to bring the water content of the mix to a predetermined value of from 1.5% to 15%, including any water of hydration that may be present, and heating the mixture to procure a reaction product.

4. The method of claim 18 wherein the temperature of the mixture is maintained below 170° C. and above 105° C. during the heating step.

5. The method of claim 18 wherein the heating of the mixture is carried out in an atmosphere having less oxygen pressure than the partial pressure of oxygen in the atmosphere.

6. The method of claim 18 where in the mixture is heated in a form having a thickness of not substantially more than 3 mm.

7. In a process for preparing a rubber conversion product, having carbon and hydrogen in the same ratio as in rubber and having less chemical unsaturation than rubber, wherein an intimate mixture of solid rubber and a solid rubber conversion reagent, which comprises a salt of a strong acid and water which with heat produces an exothermic reaction in rubber, is formed and the mixture is heated to produce a reaction product, the steps which comprise forming a mixture of solid rubber and a relatively non-volatile rubber conversion reagent, heating the conversion reagent and rubber mixture in a shape having a section not substantially more than 5 mm. in thickness in an atmosphere having less oxygen pressure than the partial pressure of oxygen in the atmosphere, maintaining the temperature in the reacting mixture below about 170° C. to procure an exothermic reaction product, and working the product to solubilize it in petroleum solvents for rubber.

8. The method of producing a rubber conversion product which comprises forming a mix of rubber, a salt of a strong acid, a weakly acidic compound and water, and heating the mix to produce a reaction product.

9. The method of producing a rubber conversion product which comprises forming a mix of rubber, a salt of a strong acid and water, heating the mix to produce a reaction product, and masticating the product, whereby it is soluble in petroleum solvents for rubber.

10. The method of producing a rubber conversion product which comprises forming a mix of rubber, a salt of a strong acid, a weakly acidic compound and water of crystallization, heating the mix to produce a reaction product, and masticating the product, whereby it is soluble in petroleum solvents for rubber.

11. In a process for producing soluble hydrocarbon rubber conversion products, having carbon and hydrogen in the same ratio as in rubber, wherein an intimate mixture of solid rubber and a rubber conversion reagent is formed and the mixture heated to provide a reaction product, the steps which comprise forming a mixture of solid rubber and a solid, relatively non-volatile conversion reagent which comprises a salt of a strong acid, which with heat forms an exothermic reaction in rubber, and which contains water, including water of crystallization, reacting the mixture in a form having thin section not substantially more than 5 mm. in thickness to provide the same with a relatively large surface area, and masticating the product to render it soluble.

12. A process for producing rubber conversion products which comprises forming an intimate mixture of rubber, an acid sulfate and a weak acid, and heating the mixture thus formed to procure a reaction.

13. A method of producing a rubber conversion product which comprises forming a mixture of rubber, a salt of a strong acid and a weakly acidic compound, adding sufficient water, if necessary, to bring the water content of the mix to a predetermined value of from 3% to 9%, including any water of hydration that may be present, and heating the mixture to procure a reaction product.

14. The method of producing a rubber conversion product which comprises forming a mix of rubber, a salt of a strong acid, a weakly acidic compound and water, and reacting the mixture in section not substantially greater than 5 mm. in thickness at temperatures between about 105° C. and 170° C. and in an atmosphere having less oxygen pressure than the partial pressure of oxygen in the atmosphere.

15. The method of claim 14 wherein the mix is controllably heated at a temperature between about 140° C. and 155° C.

16. A rubber conversion product having the same carbon to hydrogen ratio as rubber and having less chemical unsaturation than rubber, said conversion product being one prepared by mixing a salt of a strong acid and water with solid rubber and heating the mixture in a form having thin section to cause an exothermal reaction, said conversion product having less plasticity than pale crepe crude rubber has at 120° C. and after mastication being soluble in petroleum solvents for rubber.

17. In a process for producing soluble hydrocarbon rubber conversion products, having carbon and hydrogen in the same ratio as in rubber, wherein an intimate mixture of solid rubber and a rubber conversion reagent is formed and the mixture heated to provide a reaction product, the steps which comprise forming a mixture of solid rubber and conversion reagent comprising a solid, relatively non-volatile salt of a strong acid and water of crystallization, reacting the mixture in a form having a section of not substantially more than 5 mm. thickness to procure a reaction product, and masticating the product to render it soluble in petroleum solvents.

18. In a process for producing soluble rubber conversion products, having carbon and hydrogen in the same ratio as rubber, wherein an intimate mixture of solid rubber and a relatively non-volatile rubber conversion reagent, which with heat produces an exothermic reaction in rubber, and which comprises a salt of a strong acid and water, is formed and the mixture heated to provide a reaction product, the steps which comprise heating the rubber and conversion reagent mixture in a form having a relatively thin section of not substantially more than about 5 mm., and masticating the product, whereby it is soluble in petroleum solvents for rubber.

THOMAS RAYMOND GRIFFITH.